United States Patent
Harmeling et al.

(10) Patent No.: US 10,032,254 B2
(45) Date of Patent: Jul. 24, 2018

(54) METHOD AND DEVICE FOR RECOVERING A DIGITAL IMAGE FROM A SEQUENCE OF OBSERVED DIGITAL IMAGES

(75) Inventors: Stefan Harmeling, Tübingen (DE);
Michael Hirsch, Tübingen (DE); Suvrit Sra, Tübingen (DE); Bernhard Schölkopf, Tübingen (DE); Christian J. Schuler, Tübingen (DE)

(73) Assignee: Max-Planck-Gesellschaft zur Förderung der Wissenschaften e.V. (DE)

( * ) Notice: Subject to any disclaimer, the term of this patent is extended or adjusted under 35 U.S.C. 154(b) by 0 days.

(21) Appl. No.: 13/825,365

(22) PCT Filed: Sep. 28, 2011

(86) PCT No.: PCT/EP2011/004845
§ 371 (c)(1),
(2), (4) Date: Jun. 3, 2013

(87) PCT Pub. No.: WO2012/041492
PCT Pub. Date: Apr. 5, 2012

(65) Prior Publication Data
US 2013/0242129 A1    Sep. 19, 2013

Related U.S. Application Data

(60) Provisional application No. 61/387,025, filed on Sep. 28, 2010, provisional application No. 61/421,852, filed on Dec. 10, 2010.

(30) Foreign Application Priority Data

| Sep. 28, 2010 | (EP) | 10181003 |
| Dec. 10, 2010 | (EP) | 10194542 |
| Aug. 5, 2011  | (EP) | 11176703 |

(51) Int. Cl.
H04N 5/232 (2006.01)
G06T 5/00 (2006.01)
H04N 5/357 (2011.01)

(52) U.S. Cl.
CPC ............. *G06T 5/001* (2013.01); *G06T 5/003* (2013.01); *H04N 5/23229* (2013.01);
(Continued)

(58) Field of Classification Search
CPC ...................................... H04N 5/217
(Continued)

(56) References Cited

U.S. PATENT DOCUMENTS 5,696,848 A * 12/1997 Patti et al. .................. 382/254
6,088,059 A *  7/2000 Mihara et al. .............. 348/335
(Continued)

OTHER PUBLICATIONS

Joshi, N. et al., "PSF Estimation using Sharp Edge Prediction," Computer Vision and Pattern Recognition, IEEE, Piscataway, NJ, USA, Jun. 23, 2008, pp. 1-8.
(Continued)

*Primary Examiner* — James Hannett
(74) *Attorney, Agent, or Firm* — Knobbe, Martens, Olson & Bear, LLP

(57) ABSTRACT

A computer-implemented method for recovering a digital image (x) from a sequence of observed digital images ($y_1, \ldots, y_T$), includes: obtaining an observed digital image ($y_t$); estimating a point spread function ($f_t$) based on the observed image ($y_t$); estimating the recovered digital image (x), based on the estimated point spread function ($f_t$) and the observed image ($y_t$); and repeating the above steps. In order to correct optical aberrations of a lens, a point spread function of the lens may be used.

16 Claims, 7 Drawing Sheets

(52) U.S. Cl.
CPC .............. *G06T 2207/20201* (2013.01); *H04N 5/23267* (2013.01); *H04N 5/3572* (2013.01)

(58) Field of Classification Search
USPC .............. 348/222.1, 241; 382/255, 167, 131
See application file for complete search history.

(56) References Cited

U.S. PATENT DOCUMENTS

| | | | | |
|---|---|---|---|---|
| 7,936,922 | B2* | 5/2011 | Berger ........................ | 382/173 |
| 8,063,955 | B2* | 11/2011 | Povlick et al. .............. | 348/234 |
| 8,111,937 | B2* | 2/2012 | Dowski et al. .............. | 382/255 |
| 8,411,980 | B1* | 4/2013 | Wang et al. ................. | 382/254 |
| 2002/0167315 | A1* | 11/2002 | Kellman et al. ............ | 324/307 |
| 2004/0207625 | A1* | 10/2004 | Griffin ................ | A61B 5/0059 |
| | | | | 345/440 |
| 2008/0175508 | A1* | 7/2008 | Bando et al. ................ | 382/255 |
| 2009/0040330 | A1* | 2/2009 | Robinson et al. ......... | 348/222.1 |
| 2009/0067742 | A1* | 3/2009 | Lim ........................ | G06T 5/20 |
| | | | | 382/263 |

OTHER PUBLICATIONS

PCT/EP2011/0004845—Jan. 30, 2012 International Search Report and Written Opinion, WIPO.

* cited by examiner hand shaked photo of grid    artificially blurred grid    PSFs used for artificial blur A small set of PSFs can parametrize smoothly varying blur: (left) grid photographed with real camera shake, (middle) grid blurred by the EFF framework parametrized by nine PSFs (right).

How to simultaneously capture an image blurred with real camera shake and its space-varying PSF: (a) the true image and a grid of dots is combined to (b) an RBG image, that is (c) photographed with camera shake, and (d) split into blue and red channel to separate the PSF depicting the blur and the blurred image.

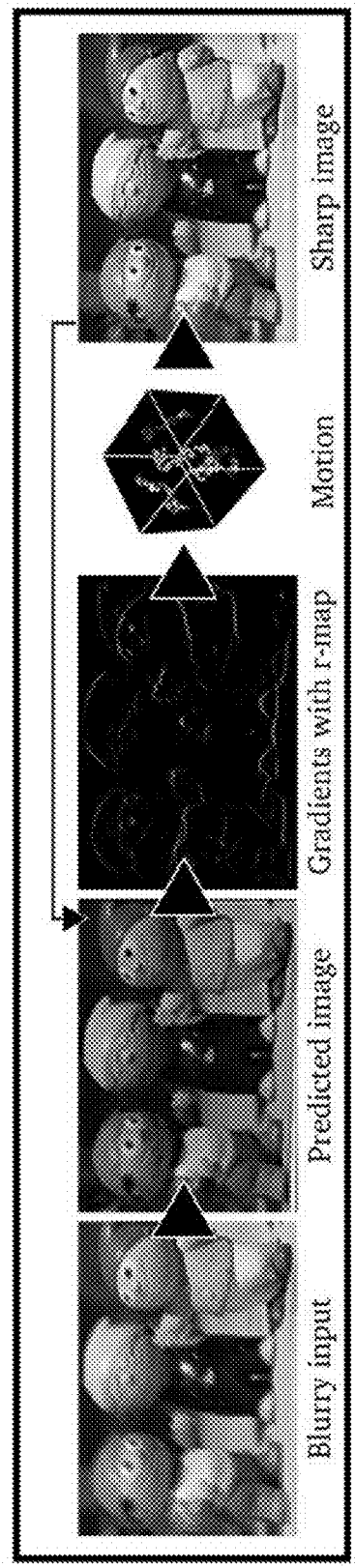

Fig. 7

Input: Stream of images $y_t$ for $t \geq 1$
Output: Reconstructed image $x$
$t \leftarrow 1$;
$x_t \leftarrow y_t$ padded with zeros or with mean;
while *another image $y_{t+1}$ available* do
  $t \leftarrow t + 1$;
  $x_t \leftarrow x_{t-1}$;
  for *a few steps* do
    $f_t = \mathrm{argmin}_{f \geq 0} \|y_t - F x_t\|^2$;
    $x_t \leftarrow x_t \odot \dfrac{F_t^\dagger y_t}{F_t^\dagger (F_t x_t)}$;
  end
end
return *last estimate $x_t$*

Online blind deconvolution for astronomical imaging

METHOD AND DEVICE FOR RECOVERING A DIGITAL IMAGE FROM A SEQUENCE OF OBSERVED DIGITAL IMAGES

The present invention relates to a method and device for reconstructing a true image or image sequence from one or more observed digital images. The observed images may be blurred due to optical aberrations of a lens, unwanted movement (camera shake) or similar phenomena.

TECHNICAL BACKGROUND AND PRIOR ART

In an ideal optical system as described theoretically by paraxial optics, all light rays emitted by a point source converge to a single point in the focal plane, forming a clear and sharp image. Departures of an optical system from this behavior are called aberrations, causing unwanted blurring of the image.

Manufacturers of photographic lenses attempt to minimize optical aberrations by combining several lenses. The design and complexity of a compound lens depends on various factors, e.g., aperture size, focal length, and constraints on distortions. Optical aberrations are inevitable and the design of a lens is always a trade-off between various parameters, including cost.

Similarly, when an astronomical object is observed from the surface of the earth, its emitted or reflected light has to pass through the atmosphere, which yields a blurry observed image. Deblurring images of an observed celestial body is therefore a fundamental problem in Astronomy. This problem is compounded by the fact that the blur is not only unknown, but is also continually changing in time as well as spatially due to refraction-index fluctuations caused by atmospheric turbulence. It is well known, that exposure times on a time scale where the turbulences are stationary (i.e. shorter than a tenth of a second) yield images that contain high-frequency information of the celestial object under investigation. This fact is exploited in Speckle Imaging, which is a collection of various techniques and algorithms for recovering high frequency information encapsulated in short-time exposure images. Due to the stochastic nature of atmospheric turbulence, Speckle Imaging techniques have to take a large number of images into account to actually regain diffraction-limited information.

In Speckle Interferometric Imaging short-exposure pictures are processed in Fourier domain. Through new developments in CCD technology which provide superior signal-to-noise ratio (Electron Multiplying CCD cameras), in recent years so-called Lucky Imaging methods have become popular. Usually a large number of images (>10000) is collected, of which only a very small percentage is utilized to yield one high quality image. Different registration and super-resolution methods have been proposed for combination of the selected images.

Camera shake, on the other hand, is a common problem of handheld, longer exposed photographs occurring especially in low light situations, e.g., inside buildings. With a few exceptions such as panning photography, camera shake is unwanted, since it often destroys details and blurs the image.

The effects of optical aberrations on a lens, of atmospheric blur or camera shake, and many others, can be expressed (or sometimes at least approximated) as linear transformations of true sharp of time image that may be written as a matrix vector-multiplication (MVM)

$$y = Ax \quad (1)$$

where x is a vector representing the sharp or true image, y is an observed image, and A is the matrix expressing the linear image transformation.

However, estimating A given both x and y is computationally prohibitive in the general case. It is therefore desirable to restrict the solution space adequately, i.e. without overly sacrificing expressiveness, in order to efficiently perform MVMs, because these are the essential operations for blind deconvolution algorithms.

It is therefore an object of the invention to provide methods for handling the effects of optical aberrations, camera shake or atmospheric blur that can be implemented efficiently and possibly executed online.

SUMMARY OF THE INVENTION

This object is achieved according to the invention by the methods and devices according to the independent claims. Advantageous embodiments are defined in the dependent claims.

The key idea of the invention is to employ a class of linear filters that are sufficiently expressive for many real-world applications while remaining computationally feasible.

According to the invention, linear filters fulfilling this requirement are the so-called Point Spread Functions (PSF). Point Spread Functions within the scope of the invention may be space-invariant or space-variant, i.e. dependent on the location of an image patch, to which it is applied.

In the case of space-invariant PSF, these filters may be represented by a vector a (of some length k), and their operation can be defined as a convolution of x with a, $$y_i = \sum_{j=0}^{k-1} a_j x_{i-j}, \text{ for } 0 \le i < m \quad (2)$$

wherein x is of length n and y of length m. The valid part may be chopped from the full convolution so that m=n−k+1. Since transformation (2) is linear in x and can be written as y=Ax for $A_{i,i+j}$=aj for 0≤i<m and 0≤j<k. In other words A contains in each row a shifted copy of a. For such a structured A, MVMs can be performed in O(n log n) multiplications using FFTs with appropriate zero-padding. If the signal is much longer than the PSF, i.e., n>>k, then the MVMs may be processed even faster by chunking the signal into patches and using the overlap-add (OLA) method of Stockham (T. STOCKHAM JR. *High-speed convolution and correlation*. In Proceedings of the Apr. 26-28, 1966, Spring Joint Computer Conference, pages 229-233. ACM, 1966). If q is the size of the FFT for the patches, then OLA costs O(n log q).

In the case of space-variant filtering, an image may be divided into distinct patches, wherein each patch may be processed with its own filter.

If the patches overlap, such space-variant filters may be implemented efficiently by a modification of the overlap-add (OLA) method according to the invention. The usual OLA method chops the image into overlapping patches, dampens the borders of each patch with some windowing function, convolves each patch with the same filter, and then adds the transformed patches to obtain the output image.

By processing each patch with its own filter, a space-variant linear filter may be obtained. More particularly, for each patch r of a multitude of p overlapping patches of an input image x (0≤r<p), a windowing function w(r) (represented as a vector of the same length as x) may be used that is non-zero only for the interval of the corresponding patch in x. Entry-wise multiplication of w(r) with x, sets all entries in x outside the r-th patch to zero, windowing the remaining entries. Denoting the p filters of length k by a(r) (0=r<p), the space-variant filter according to the invention may be defined as $$y_i = \sum_{r=0}^{p-1}\sum_{j=0}^{k-1} a_j^{(r)} w_{i-j}^{(r)} x_{i-j}, 0 \le i < m. \quad (3)$$

For fixed patch size and fixed number of patches, the amount of overlap and the locations of the patches can be calculated. The parameters of the space-variant filter (0)(k−1) are the k position-dependent point spread functions $a^{(0)}, \ldots, a^{(k-1)}$.

In order to avoid artifacts at the overlapping areas of the patches in the output image y, the chosen window functions must add up to one, i.e.

$$\sum_{r=0}^{p-1} w_i^r = 1 \text{ for } 0 \le i < m. \quad (4)$$

In practice, normalizing the window functions may always enforce this property.

Since x appears only linearly in Eq. (3), it may be written as y=Ax. The filter matrix A is given by $$A = \sum_{r=0}^{p-1} A^{(r)} \mathrm{Diag}(w^{(r)}) \quad (5)$$

where $A^{(r)}$ is the matrix corresponding to the convolution $a^{(r)}(0=r<p)$, and Diag(v) is a diagonal matrix that has vector v along its diagonal. However, this representation does not describe how MVMs with A, nor with $A^T$, can be efficiently computed. For that, A may equivalently be expressed as the following sum of a product of matrices:

$$A = Z_y^T \sum_{r=0}^{p-1} C_r^T F^H \mathrm{Diag}(FZ_a a^{(r)}) FC_r \mathrm{Diag}(w^{(r)}) \quad (6)$$

wherein (i) $C_r$ is a matrix that chops the r-th patch from a vector of length n; (ii) $Z_a$ is a zero-padding matrix that appends zeros to a(r) such that its size matches the patch size; (iii) F is the Discrete Fourier Transform (DFT) matrix (implemented by FFT); (iv) $F^H$ is the Hermitian of the DFT matrix (implemented by inverse FFT); and (v) $Z_y$ is the zero-padding matrix that prepends zeros to a vector such that its size matches the size of the vector resulting from the summation. The proof that Eq. (6) faithfully represents A follows directly from the FFT implementation of convolution.

Reading Eq. (6) from right to left this expression succinctly describes the steps needed to efficiently compute Ax. One may also read off $A^T$ as $$A^T = \sum_{r=0}^{p-1} \mathrm{Diag}(w^{(r)}) C_r^T F^T \mathrm{Diag}(\overline{FZ_a a^{(r)}}) \overline{F} C_r Z_y \quad (7)$$

$$= \sum_{r=0}^{p-1} \mathrm{Diag}(w^{(r)}) C_r^T F^H \overline{\mathrm{Diag}(FZ_a a^{(r)})} FC_r Z_y$$

where $\overline{A}$ is the component-wise complex conjugate of A. Eq. (7) is correct because A is a real valued matrix, whereby $A = \overline{A}$. Reading Eq. (7) from right to left describes the steps needed to efficiently calculate MVM for $A^T$. In other words, the steps are similar as in Eq. (6), but with windowing at the end instead of the beginning, and with complex conjugation of the FFT of the PSFs, resulting in calculating patch-wise correlations instead of convolutions.

For non-blind deconvolution with a space-variant filter A, efficient MVMs with A and $A^T$ suffice.

For blind deconvolution, since Eq. (3) is also linear in the k PSFs, one may define a matrix X such that y=Ax=Xa, where a denotes the stacked sequence of PSFs $a^{(0)}, \ldots, a^{(p-1)}$. Now Eq. (6) may be rewritten using D(v)w=D(w)v and some matrix $B_r$ that chops the r-th PSF from the vector a, $$X = Z_y^T \sum_{r=0}^{p-1} C_v^T F^H \mathrm{Diag}(FC_r \mathrm{Diag}(w^{(r)})x) FZ_a B_r \quad (8)$$

This expression allows deriving an algorithm for efficient MVM with $X^T$ simply by taking the transpose of the expression for X, $$X^T = \sum_{r=0}^{p-1} B_r^T Z_a^T F^T \mathrm{Diag}(FC_r \mathrm{Diag}(w^{(r)})x) \overline{F} C_r Z_y \quad (9)$$

$$= \sum_{r=0}^{p-1} B_r^T Z_a^T F^H \overline{\mathrm{Diag}(FC_r \mathrm{Diag}(w^{(r)})x)} FC_r Z_y$$

where $X=\overline{X}$ may again be used, as X is real. In words, the algorithm implied by Eq. (9) for $X^T$v consists of splitting v into patches, correlating them with the patches from x, and finally summing up the results.

The computational complexity of the above described MVMs for A, $A^T$, X, and $X^T$ is the same as the overlap-add method for space-invariant filtering which is about O(n log q), where q is the size of the FFT for the patches. In other words, the space-variant linear filters according to the invention may be implemented as efficiently as space-invariant filters. Since the PSFs a(r) are much smaller than the input image x, the memory requirement for storing the space-variant filter is much less than O(mn) needed by a general linear transformation. However, estimating the parameters for the above-described transformations (e.g., in blind deconvolution), is usually more costly, since the number of parameters increases with the number of patches, while for space-invariant filters, only a single filter needs to estimated.

As regards expressivity, a space-invariant filter represented by a PSF a is a special case of the space-variant filters according to the invention. When all PSFs a(r)=a, using (4), it may be seen that (3) reduces to (2).

At the other extreme, space-variant filters according to the invention can implement any linear transformation A using m image patches, one for each row of A. Then, all window functions may be set to constant 1/m, and the PSFs characterizing the space-variant filtering to the rows of A. This case is degenerate as patches overlap completely and PSFs, as long as the signal, are only evaluated once. But it shows that space-variant filtering according to the invention actually covers the entire range from space-invariant filtering to arbitrary linear transformations, trading computational efficiency for being more expressive.

The inventive approach to solving the problem has the following main advantages:

- It has low resource requirements because the images may be tackled in a streaming fashion; this obviates the need to store the images, and results in a more efficient algorithm (in terms of run-time and memory usage).
- Typical online methods usually require the setting of a learning rate. The inventive method is based on multiplicative updates to the image estimate that effectively bypasses the need to set a learning rate, which simplifies the algorithm and its implementation.
- The method is very simple to implement, and it can be implemented in the imaging hardware itself to provide dynamic deblurring, if desired.

DESCRIPTION OF THE FIGURES

These and other aspects, advantages and features of the present invention will be more readily understood when studying the following detailed description of different embodiments of the present invention, in connection with the drawing in which

FIG. 6 shows an overview of the blur estimation phase.

FIG. 7 shows an algorithm for online blind deconvolution for astronomical imaging.

DETAILED DESCRIPTION

Figure 1:
FIG. 1 shows an experimental setup with motor-driven platform and camera used for measuring a point spread function of a lens.
Figure 2:
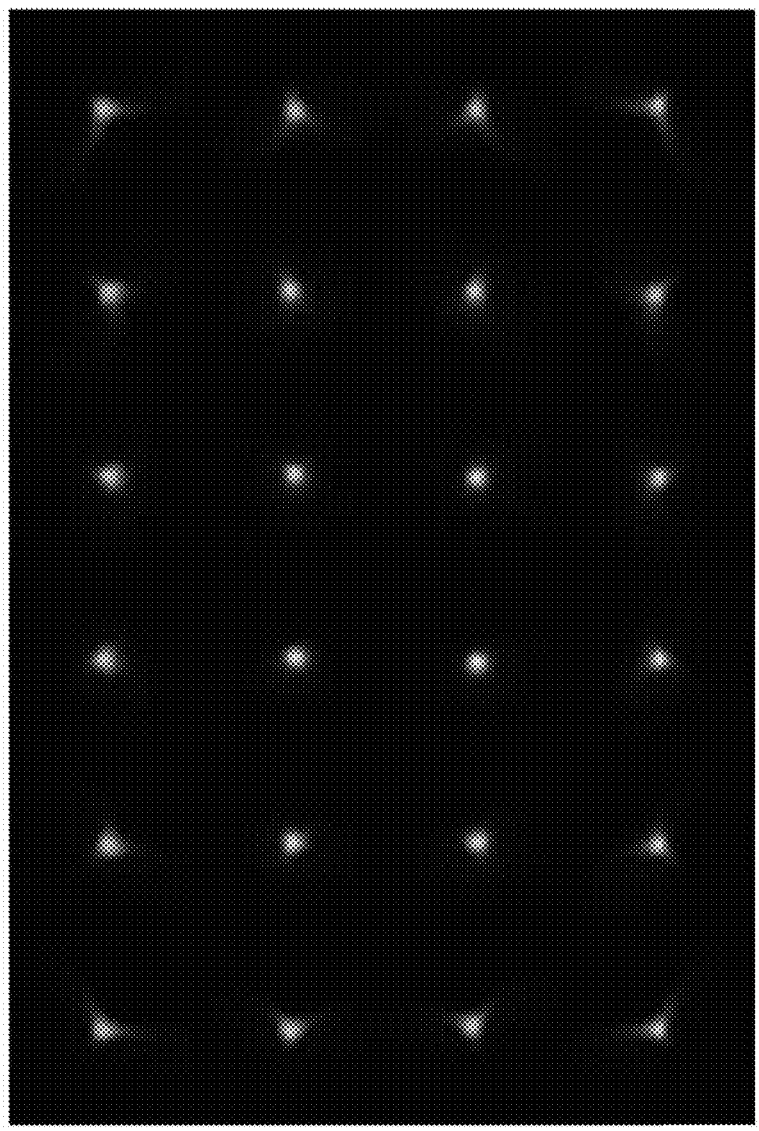
FIG. 2 shows a point spread function used for simulations.

For simplicity, the invention shall be described for vector-valued images. The generalization to matrix-valued images is straightforward.

I. In a first embodiment of the invention, it will be shown how to alleviate image degradations caused by imperfect optics. A calibration step may be used to encode the optical aberrations of an optical system in a space-variant point spread function (PSF). A corrected image may then be obtained by non-stationary deconvolution using that function. By including the Bayer array in the image formation model, demosaicing may be performed as part of the deconvolution.

In a first aspect, the invention is suitable for correcting monochromatic aberrations in a lens or optical system, including spherical aberration (in spherical lenses, the focal length is a function of the distance from the axis) as well as a number of off-axis aberrations: coma occurs in an oblique light bundle when the intersection of the rays is shifted w.r.t. its axis; field curvature occurs when the focal surface is non-planar; astigmatism denotes the case when the sagittal and tangential focal surfaces do not coincide (i.e., the system is not rotationally symmetric for off axis light bundles). All these monochromatic aberrations lead to blur that varies across the image. Any such blur can be expressed in the EFF framework by appropriately choosing the local blur filter $f^{(0)}, \ldots f^{(P-1)}$.

In a second aspect, the invention may also be used for correcting chromatic aberrations in a lens or optical system. The refraction index of most materials including glass is dependent of the wavelength of the transmitted light. Axially, this results in the focus of a lens being a function of the wavelength (longitudinal chromatic aberration); off-axis, we observe lateral color caused by the fact that the different focal lengths for different wavelengths directly imply that the image scale slightly varies with wavelength.

For instance, blur of blue light is slightly different in shape and position than blur of red light. According to the invention, such chromatic aberration may be described by modeling the three color channels with separate space-variant PSFs. More specifically, suppose $x_R$, $x_G$, and $x_B$ are the three color channels of the true image $x=[x_R^T, x_G^T, x_B^T]^T$, all of which are column vectors for simplicity, and for each color channel the space-variant blur may be modeled with the EFF matrices $F_R$, $F_G$, $F_B$ from Eq. (3). Then, the image z that enters the color filter array (CFA) of the image sensor, i.e., before Bayer filtering/mosaicing may be written as $$z = \begin{bmatrix} z_R \\ z_G \\ z_B \end{bmatrix} = \begin{bmatrix} F_R x_R \\ F_G x_G \\ F_B x_B \end{bmatrix} = \begin{bmatrix} F_R & 0 & 0 \\ 0 & F_G & 0 \\ 0 & 0 & F_B \end{bmatrix} x \quad (10)$$

In a third aspect, the invention also comprises an efficient way of correcting so-called vignetting. Because oblique light bundles do not reach the focal plane in their entirety, the intensity of the image falls off towards the image corners. This can be corrected by photographing a flat field frame, i.e., an image of a homogeneous background, and dividing the image by it. While this is straightforward, the invention can also handle vignetting by omitting the energy conservation constraint. In that case, the filters $f^{(r)}$ in Eq. (1) do not have to sum up to one, i.e., it is only required that $\Sigma_j f_j^{(r)} \leq 1$ and $f_j^{(r)} \geq 0$ for all j and r. By allowing dimmer filters, the inventive procedure that corrects for vignetting. Note that Eq. (2) is unaffected by relaxing the energy conservation constraint.

Up to now the forward model from the true full-color image x consisting of three color channels $x_R$, $x_G$, and $x_B$ to the full-color image z blurred by the lens aberrations was described. It is the image that will enter the CFA, just before being mosaiced, i.e., z contains the complete chrominance information of all three color channels. The operation of the CFA may be described as a linear map represented by some matrix D, whose result y=Dz will be the image that hits the photo-sensitive sensor behind the CFA, which may be identified with the raw image stored in the camera. The matrix D is a rectangular matrix with three times as many columns than rows.

The forward model combines the lens aberration and Bayer filtering into a single matrix A and adds noise n, i.e.

$$y = D \begin{bmatrix} F_R & 0 & 0 \\ 0 & F_G & 0 \\ 0 & 0 & F_B \end{bmatrix} x + n = Ax + n \quad (11)$$

Assuming the weights in the Bayer matrix D to be fixed and known (a trivial Bayer matrix may be used disregarding cross-talk between color channels) the linear transformation A, i.e. the PSF, is parameterized by the set of filters that determine the EFF matrices $F_R$, $F_G$, and $F_B$ for the three color channels. These filters depend on the lens and the camera used.

Assuming the noise in Eq. (5) to be Gaussian, in principle the unknown full-color image x may be recovered from a measured raw image y by solving a least-squares problem, i.e. by minimizing $\|y-Ax\|_2^2$ w.r.t. x. However, the PSF parameterized by the EFF framework is only an approximation of the true PSF which leads to suboptimal results when minimizing the $L_2$ norm. Therefore, it is preferred to minimize the $L_1$ norm $\|y-Ax\|_1$ which leads to better results.

One challenge of processing real photos is that pixels might be saturated, i.e. their true values are clipped due to limited dynamic range. Thus the measured values of clipped pixels are not in agreement with the physical model of the blur. Saturated pixels may be excluded in the data-fidelity term $\|y-Ax\|_1$ by summing only over non-saturated pixels. This term corresponds to the likelihood term (or data fit) of the implicitly underlying probabilistic model. However, because the inventive method tries to estimate three color channels from a single raw image, i.e., there are three times as many unknowns as observations, our deblurring problem is ill-posed. To regularize it one may include prior knowledge about natural images: it has been shown that the image gradients approximately follow a hyper-Laplacian distribution. This can be incorporated into the optimization problem by adding a regularization term of the form $\|\nabla x\|_1^\gamma$ to the objective function. The effect of this regularization is to penalize strong gradients and therefore to smooth the image. Following Farsiu et al. (S. Farsiu, M. Elad, and P. Milanfar. *Multiframe demosaicing and super-resolution of color images*. IEEE Trans. Image Process., 15(1):141-159, 2006.), the RGB image may be transformed to a luminance/chrominance color space (in the present embodiment of the invention, YUV is used) before applying the regularization. This allows regularizing more strongly in the chrominance channels, and less in luminance. The human eye is more sensitive to differences in luminance than in chrominance, i.e., a visually pleasing result has to be sharp in the luminance channel. The transformation from RGB to YUV is a matrix vector multiplication, $$\begin{bmatrix} x_Y \\ x_U \\ x_V \end{bmatrix} = C \begin{bmatrix} x_R \\ x_G \\ x_B \end{bmatrix}$$

with appropriately chosen matrix C. With $x_Y$, $x_U$, and $x_V$ a possible combined objective function according to the invention may be written as $$\|y-Ax\|_2^2 + \alpha\|\nabla x_Y\|_1^\gamma + \beta\|\nabla x_U\|_1^\gamma + \beta\|\nabla x_V\|_1^\gamma + n\sigma^2(\|x_R\|_2^2/4 + \|x_G\|_2^2/2 + \|x_B\|_2^2/4) \quad (12)$$

Good results were obtained by setting $\alpha=10^{-4}$, $\beta=10^{-3}$ and $\gamma=0.65$ and $\sigma=10^{-3}$ in simulated experiments by the inventors. On real images, the optimal values for $\alpha$ and $\beta$ were smaller by a factor of ten.

The objective function may be minimized w.r.t. x adapting Krishnan and Fergus' (D. Krishnan and R. Fergus. *Fast image deconvolution using hyper-Laplacian priors*. In Advances in Neural Inform. Process. Syst., 2009.) approach to the setup of the invention, alternating between a convex and a non-convex phase, with the non-convex phase being accelerated by a lookup table.

In order to improve speed of execution, the invention may also be used for direct deconvolution in Fourier Space with a slightly modified version of the inventive objective function. Since the demosaicing operator is not diagonal in Fourier space, one may work on each already demosaiced color channel separately and solve the problem $$\|y-Bx\|_2^2 + \alpha\|\nabla x_Y\|_1^\gamma + n\sigma^2\|x\|_2^2 \quad (13)$$

However, the inversion of B is necessary. Using the above-described relations the application of B in the inventive framework can be written as $$\sum_r L_r^T F^H \text{Diag}(FPf^{(r)}) FK_r \text{Diag}(w^{(r)}) \quad (14)$$

In this summation over all patches, the matrix P zero-pads each patch, the matrices Kr and Lr are cropping matrices. F applies the discrete Fourier transform. This expression can be approximately inverted as $$x \approx N \sum_r \text{Diag}(w^{(r)})^{1/2}, \quad (15)$$

$$K_r^T F^{+1} \frac{\overline{FPf^{(r)}} \odot (FL_r \text{Diag}(m^{(r)})^{1/2} y)}{|FPf^{(r)}|^2 + |FR|^2}$$

where |z| and $\bar{z}$ denote entry-wise absolute value and complex conjugate, respectively. The matrix R regularizes the result, e.g., a discrete Laplace operator. The weighting N is obtained by applying the inversion to a constant image and is necessary to remove artifacts stemming from inverting the windows. While losing a small amount of image quality, the running time is only 2 minutes for a 21.1 megapixel image.

Leaving aside diffraction effects (e.g., by ensuring the pixel size to be larger than the Airy disk), a point light source should influence just a single pixel on the imaging sensor of a digital camera. However, this would only happen if a digital camera was a perfect optical system. In practice, the various lens aberrations discussed above will spread out the point light source over a larger region of the imaging sensor. This local pattern characterizes the PSF, so by recording these patterns across the image plane the filters of the non-stationary convolution may be set as described above.

To automate the measurements needed for setting the Point Spread Function(s) (PSF), a camera may be mounted on a motor-driven platform with two rotational degrees of freedom as shown in FIG. 1. A lens measurement process may be conducted in a dark room by remotely changing the angles of the camera towards a point light source (a gas lamp emitting light through an aperture of 100 μm in 12 meters distance) such that in subsequent exposures the light point may be captured at equidistant locations on the sensor. In experiments the inventors used an 18 times 27 grid of supporting points for the EFF framework. The blur kernels were recorded by averaging three images of the point light source and thresholding noise.

II. According to a second embodiment of the invention, the above-described ideas may also be applied to the correction of camera shakes. Camera shake is a common problem of handheld, longer exposed photographs occurring especially in low light situations, e.g., inside buildings. With a few exceptions such as panning photography, camera shake is unwanted, since it often destroys details and blurs the image. The effect of a particular camera shake can be described by a linear transformation on the sharp image, i.e., the image that would have been recorded using a tripod. Denoting for simplicity images as column vectors, the recorded blurry image y can be written as a linear transformation of the sharp image x, i.e., as y=Ax, where A is an unknown matrix describing the camera shake. The task of blind image deblurring is to recover x given only the blurred image y, but not A.

To obtain a generalized image deblurring method the linear transformation y=Ax may be represented by the above-described efficient filter flow that can handle smoothly varying PSFs.

Figure 3:
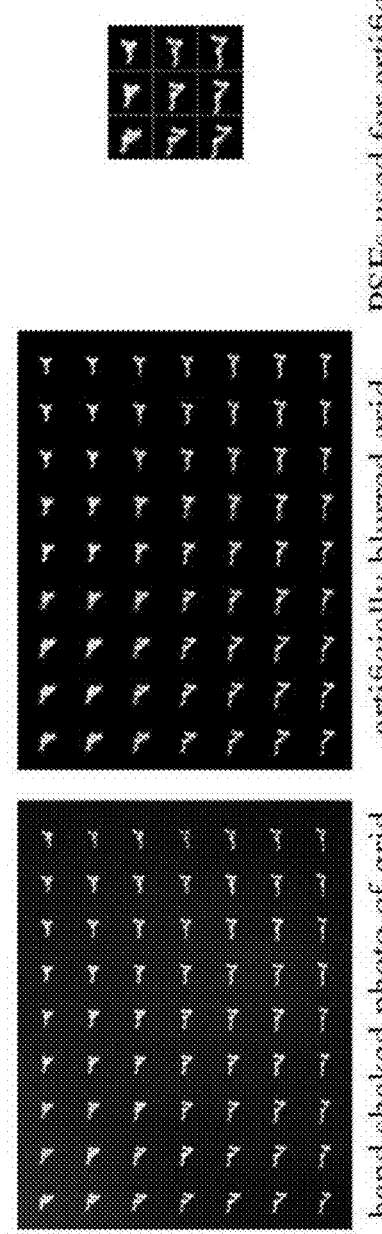
FIG. 3 shows how a small set of PSFs can parameterize smoothly varying blur: (left) grid photographed with real camera shake, (middle) grid blurred by the EFF framework parameterized by nine PSFs (right).
Figure 4:
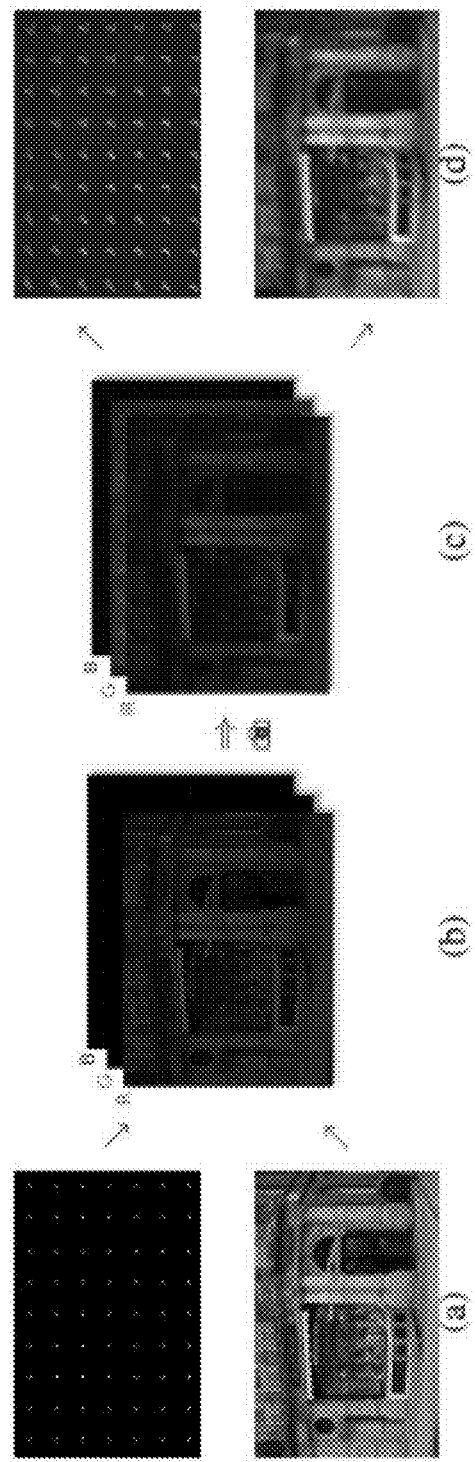
FIG. 4 shows how to simultaneously capture an image blurred with real camera shake and its space-varying PSF; (a) the true image and a grid of dots is combined to (b) an RBG image that is (c) photographed with camera shake, and (d) split into blue and red channel to separate the PSF depicting the blur and the blurred image.
Figure 5:
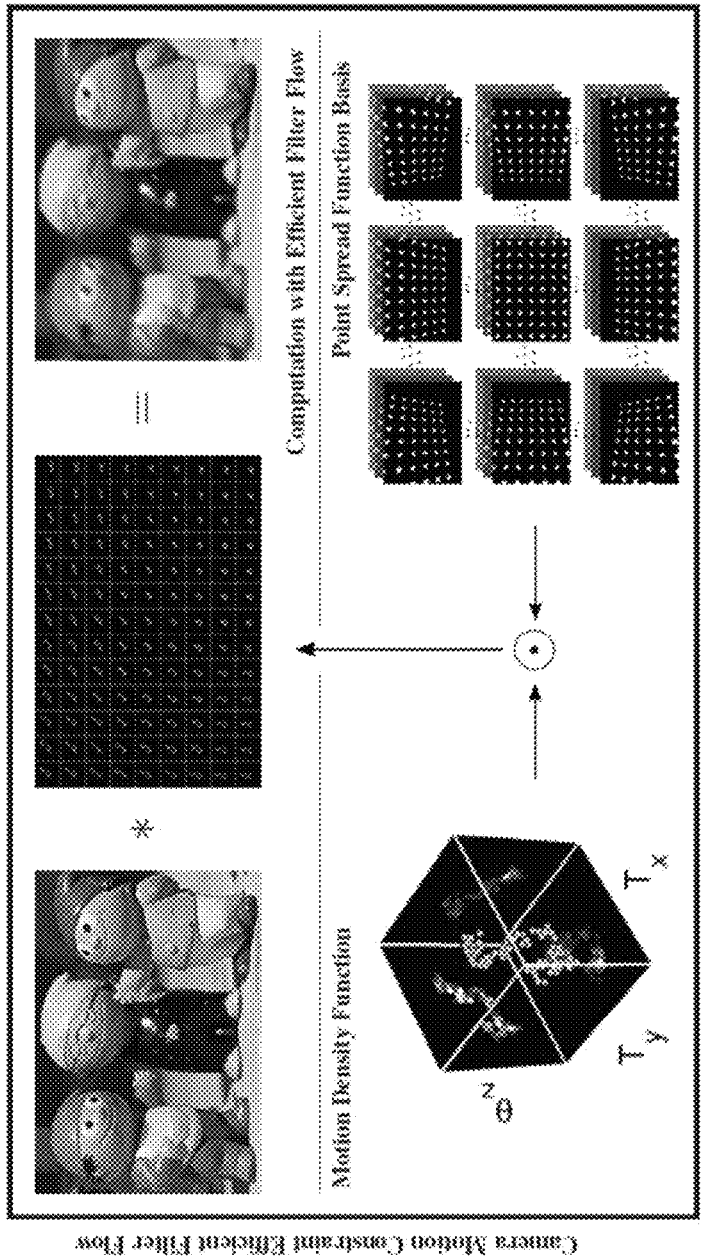
FIG. 5 shows how to apply all possible homographies only once to a grid of single-pixel dots and how the possible camera shakes can then be generated by linearly combining different homographies of the point grid.

The inventive method does not simply apply a different PSF to different image regions, but instead yields a different PSF for each pixel. The reason is that usually, the patches are chosen to overlap at least 50%, so that the PSF at a pixel is a certain linear combination of several filters, where the weights are chosen to smoothly blend filters in and out, and thus the PSF tends to be different at each pixel. FIG. 3 shows that a PSF array as small as 3×3, corresponding to p=9 and nine overlapping patches (right panel of the bottom row), can parameterize smoothly varying blurs (middle column) that closely mimic real camera shake (left column).

A single-image blind deconvolution algorithm for correcting camera shakes according to the invention estimates the parameter vector a of the EFF transformation and performing space-variant non-blind deconvolution in order to obtain the corrected image.

More particularly, if x is initialized with the blurry image y, the estimation of the linear transformation A parameterized as an EFF, may be performed as follows:

In step X10, noise may be removed in flat regions of the image x by edge-preserving bilateral filtering and overemphasize edges by shock filtering. To counter enhanced noise by shock filtering, spatially adaptive gradient magnitude thresholding may be applied.

The prediction step of the present invention is similar to the prediction step presented by Cho and Lee. It avoids nonlinear optimizations which would be necessary if the image features emphasized by the nonlinear filtering operations (namely shock and bilateral filtering and gradient magnitude thresholding) would have to be implemented by an image prior on x. The method according to the present embodiment of the invention also profits from this trick and the hyper-parameters may be set exactly as Cho and Lee do (see [2] for details on the nonlinear filtering operations). However, the gradient thresholding is applied spatially adaptive, i.e., on each patch separately. Otherwise, a large gradient in some region may totally wipe out the gradients in regions that are less textured, leading to poor PSF estimates in those regions.

In step X20, the estimates for the PSFs may be updated, given the blurry image y and the current estimate of the predicted x, using only the gradient images of x (resulting in a preconditioning effect) and enforcing smoothness between neighboring PSFs.

Given the thresholded gradient images of the nonlinear filtered image x as the output of the prediction step, the PSF estimation minimizes a regularized least-squares cost function, $$\sum_z \|\partial_z y - A \partial_z x\|^2 + \lambda \|a\|^2 + v g(a) \tag{16}$$

where z ranges over the set {h, v, hh, vv, hv}, i.e., the first and second, horizontal and vertical derivatives of y and x are considered. Omitting the zero-th derivative (i.e., the images x and y themselves) has a preconditioning effect as discussed in Cho and Lee. Matrix A depends on the vector of PSFs a as well.

A regularization term g(a) may be added which encourages similarity between neighboring PSFs, $$g(a) = \sum_{r=0}^{p-1} \sum_{s \in N(r)} \|a^{(r)} - a^{(s)}\|^2 \tag{17}$$

where s∈N (r) if patches r and s are neighbors.

In step X30, regions of poorly estimated PSFs may optionally be identified and replaced with neighboring PSFs.

Since high-frequency information, i.e. image details are required for PSF estimation, for images with less structured areas (such as sky) reasonable PSFs may not be estimated everywhere. The problem stems from the finding that even though some area might be less informative about the local PSF, it can look blurred, and thus would require deconvolution. These areas may be identified by thresholding the entropy of the corresponding PSFs. The rejected PSFs may be replaced by the average of their neighboring PSFs. Since there might be areas for which the neighboring PSFs have been rejected as well, a recursive procedure may be performed which propagates the accepted PSFs to the rejected ones.

In step X40, the current deblurred image x may be updated by minimizing a least-squares cost function using a smoothness prior on the gradient image.

In both Cho and Lee's and also in Krishnan and Fergus' work, the image estimation step involves direct deconvolution which corresponds to a simple pixelwise division of the blurry image by the zero-padded PSF in Fourier domain. Unfortunately, a direct deconvolution does not exist in general for linear transformations represented as EFF, since it involves summations over patches. However, the direct deconvolution may be replaced by an optimization of some regularized least-squares cost function $\|y - Ax\|^2 + \alpha \|\nabla x\|^p$.

While estimating the linear transformation in (i), the regularizer is Tikhonov on the gradient image, i.e., p=2. As the estimated x is subsequently processed in the prediction step, one might consider regularization redundant in the image estimation step of (i). However, the regularization is crucial for suppressing ringing due to insufficient estimation of a.

The main difference in the image estimation steps to [2] and [3] is that the linear transformation A is no longer a convolution but instead a space-variant filter implemented by the EFF framework.

In the present embodiment, the above-described steps are repeated seven times on each scale of a multi-scale image pyramid. They start with flat PSFs of size 3×3 pixels and the correspondingly downsampled observed image. For up- and downsampling a simple linear interpolation scheme may be employed. The resulting PSFs in a and the resulting image x at each scale are upsampled and initialize the next scale. The final outputs of this iterative procedure are the PSFs that parameterize the spatially varying linear transformation.

Having obtained an estimate for the linear transformation in form of an array of PSFs, the alternating steps of (ii) perform space variant non-blind deconvolution of the recorded image y using a natural image statistics prior (as in [13]). To this end, the recently proposed method of Krishnan and Fergus may be adapted to deal with linear transformations represented as EFF.

In step X50, latent variables regularized with a sparsity prior are estimated that approximate the gradient of x. This can be efficiently solved with look-up tables.

In step X60, the current deblurred image x is updated by minimizing a least squares cost function while penalizing the Euclidean norm of the gradient image to the latent variables of the previous step.

III. In an alternative embodiment of the invention, a method for correcting a digital image for camera shakes is given as follows:

Let g be the blurry photograph for which we would like to recover a sharp version f EFF approximates a nonstationary blur as the sum of R differently blurred patches, $$g = \sum_{r=1}^{R} a^{(r)} * (w^{(r)} \times f) \quad (18)$$

where the weighting image $w^{(r)}$ has the same size as the sharp image f, so the r-th patch can be written as $w^{(r)} \times f$ with × being the pixel-wise (Hadamard) product. The stationary blur (aka convolution) with the r-th blur kernel $a^{(r)}$ is denoted as $a^{(r)}*$. Since $w^{(r)} \geq 0$ is chosen to be only non-zero in a small region off, the convolution of each patch can be implemented efficiently with short fast Fourier transforms (FFTs). If the patches are chosen with sufficient overlap and the $a^{(r)}$ are distinct, the blur expressed by the EFF will be different at each image location, varying gradually from pixel to pixel.

To restrict the possible blurs of EFF to camera shake, a basis for the blur kernels $a^{(r)}$ may be created using homographies. However, instead of applying the homographies to the sharp image f (as done in [25, 6]), the invention applies all possible homographies only once to a grid of single-pixel dots. The possible camera shakes can then be generated by linearly combining different homographies of the point grid, see FIG. 1. Note that those homographies can be precomputed without knowledge of the blurry image g.

More particularly, let p be the image of delta peaks, where the peaks are exactly located at the centers of the patches, and p has the same size as the sharp image f. The center of a patch is determined by the center of the support of the corresponding weight images $w^{(r)}$. Let θ index a set of homographies and denote a particular homography by $H_θ$. Then different views $p_θ = H_θ(p)$ of the point grid p may be generated by applying a homography $H_θ$, where $p_θ$ is again an image of the same size as f Appropriately chopping these views $p_θ$ into local blur kernels $b_θ^{(r)}$, one for each patch, a basis for the local blur kernels $a^{(r)}$ may be obtained, which may now be restricted to linear combinations of the basis blur kernels, $$a^{(r)} = \sum_θ \mu_θ b_θ^{(r)} \quad (19)$$

where $\mu_θ$ determines the relevance of the corresponding homography for the overall blur, i.e., $\mu_θ$ does not depend on the patch index r. The construction of the blur kernel basis ensures that the resulting overall blur parameterized by the $a^{(r)}$ corresponds to a possible camera shake. Such linear combinations correspond not to a single homography, but linearly combine several homographies, which form a possible camera shake. A fast forward model for camera shake according to the invention may therefore be written as:

$$g = \mu \diamond f := \sum_r \left( \sum_θ \mu_θ b_θ^{(r)} \right) * (w^{(r)} \times f) \quad (20)$$

Here the notation $\mu \diamond f$ is introduced to denote the fast forward model for camera shake according to the invention. This model parameterizes the camera shake with the parameters $\mu_θ$, which are summarized in the vector $\mu$. These parameters appear only linearly, which is crucial for efficient optimization. Likewise, the sharp image f appears only linearly for fixed $\mu$. Thus there exist matrices M and A, such that the forward model for vector-valued images can be expressed as matrix-vector-multiplications (MVMs), $$g = \mu \diamond f = Mf = A\mu \quad (21)$$

This notation will henceforth be used for convenience; all formulas for vector-valued images can be straightforwardly generalized to matrix-valued images.

To efficiently evaluate the forward model, or in other words to compute the MVM with M or X, one may first calculate all $a^{(r)}$ using the blur parameters $\mu$ and blur kernel basis (with Eq. (2)) and then run the fast implementation of EFF detailed above. Similarly one may obtain fast implementations of the MVMs with $M^T$ and $A^T$. The homography calculations on the point grid p may be precomputed, and are neither required after updating the blur parameters $\mu_θ$ nor after updating the estimate of the sharp image estimate. This fact is essential for a fast runtime of the inventive method.

Now starting with a photograph g that has been blurred by camera shake, the unknown sharp image f may be recovered in two phases: (i) a blur estimation phase for non-stationary PSFs, and (ii) the sharp image recovery using a non-blind deconvolution procedure, tailored to non-stationary blurs. In the following, the individual steps of both phases will be described in detail and where appropriate the values of hyper-parameters are explicitly included that determine the weighting between the terms involved. These values were fixed during all experiments of the inventors.

In the first phase, the inventive method tries to recover a motion undertaken by the camera during exposure given only the blurry photo:

In step Y10, a combination of shock and bilateral filtering may be used in order to reduce blur and enhance image quality. The blur parameters are estimated by finding the best non-stationary blur which transforms the current image estimate f into the recorded blurry image g. However, in the beginning, the current estimate f might not be even close to the sharp image, and after a few iterations, it might still be slightly blurry. To accelerate the convergence of the blur parameter estimation, the prediction step may emphasize edges in f by shock filtering and lower the importance of flat noisy regions by bilateral filtering.

In step Y20, the camera motion parameters are estimated, which best explain the blurry picture from the predicted image of step Y10. For notational simplicity it is assumed that g, μ, and f are vector-valued. The blur or camera motion parameters μ may be updated by minimizing $$\|\partial g - M_S \times \partial(\mu \diamond \tilde{f})\|_2^2 + \frac{1}{10}\|\mu\|_2^2 + \frac{1}{2}\|\partial \mu\|_2^2 \qquad (22)$$

where the discrete derivative of g may be written symbolically as a ∂g, i.e. ∂g=[1, −1]$^T$*g. For matrix-valued images, the horizontal and vertical derivatives are considered. Furthermore, $\tilde{f}$ denotes the outcome of the prediction step (i) and $M_S$ is a weighting mask which selects only edges that are informative and facilitate kernel estimation. In particular, it neglects structures that are smaller in size than the local kernels, which could be misleading for the kernel estimation.

The terms in Eq. (22) can be motivated as follows: The first term is proportional to the log-likelihood, $\|\partial g-\partial(\mu \diamond \tilde{f})\|_2^2$ if additive Gaussian noise n is assumed. Considering the derivatives of g and μ ◇ f brings several benefits: First, Shan et al. [20] have shown that such terms with image derivatives help to reduce ringing artifacts by putting weight on the edges. Secondly, it lowers the condition number of the optimization problem Eq. 5 and hence leads to faster convergence. The second summand $\|\mu\|_2^2$ penalizes the $L_2$ norm of μ and helps to void the trivial solution by suppressing high intensity values in μ. The third term $\|\partial\mu\|_2^2$ enforces smoothness of μ, and thus favors connectedness in camera motion space.

In step Y30, the latent image is estimated via non-blind deconvolution. The sharp image estimate f that is repeatedly updated during the blur estimation phase does not need to recover the true sharp image perfectly. However, it should guide the PSF estimation during the alternating updates, i.e. steps Y10, Y20, and Y30. Since most computational time is spent in this first phase, the sharp image update step should be fast. This motivates to employ $L_2$ based regularization terms for the sharp image, even though the resulting estimates might show some ringing and possibly other artifacts (which are dealt with in the prediction step). Thus one would like to minimize $$\|g-\mu \diamond f\|_2^2 + \frac{1}{2}\|\partial f\|_2^2 \qquad (23)$$

with respect to f.

Cho and Lee gained large speed-ups for this step by replacing the iterative optimization in f by a pixel-wise division in Fourier space. They showed that such a noniterative update step despite its known restoration artifacts is sufficient to guide the PSF estimation. We call such pixel-wise divisions in Fourier space Direct Deconvolutions (DDs) and provide a similar update for our fast forward model for camera shake.

First, adapt the matrix expression given in [8] may be adapted to obtain an explicit expression for M introduced in Sec. 3, $$g = \underbrace{\sum_r E_r^T F^H \text{Diag}(FZ_a B^{(r)}\mu)FC_r\text{Diag}(w^{(r)})}_{M} f \qquad (24)$$

where $B^{(r)}$ is the matrix with column vectors $b_\theta^{(r)}$ for varying θ, i.e. $a^{(r)}=B^{(r)}\mu=\Sigma_\theta \mu_\theta b_\theta^{(r)}$. Matrices $C_r$ and $E_r$ are appropriately chosen cropping matrices, F is the discrete Fourier transform matrix, and $Z_a$ a zero-padding matrix. Furthermore, Diag(v) denotes the diagonal matrix with vector v along its diagonal.

The basic idea for a direct update step of the image estimate is to combine the patch-wise pixel-wise divisions in Fourier space with reweighting and edge fading to minimize ringing artifacts. The following expression may be used to approximately "invert" the inventive forward model g=M f.

$$f \approx \text{Diag}(v)\sum_r \text{Diag}(w^{(r)})^{1/2}C_r^T F^H \frac{\overline{FZ_a B^{(r)}\mu} \times (FE_r\text{Diag}(w^{(r)})^{1/2}g)}{|FZ_a B^{(r)}\mu|^2 + \frac{1}{2}|FZ_l l|^2} \qquad (25)$$

where $\|z\|$ for a vector z with complex entries calculates the entry-wise absolute value, and $\bar{z}$ the entry-wise complex conjugate. The square root is taken pixel-wise. The term Diag(v) is some additional weighting which we experimentally justify in the next paragraph. The fraction has to be implemented pixel-wise. The term $|FZ_1l|^2$ in the denominator of the fraction originates from the regularization in Eq. (6) with l=[−1, 2, −1]$^T$ corresponding to the discrete Laplace operator.

The update formula in Eq. (24) approximates the true sharp image f given the blurry photograph g and the blur parameters μ and can be implemented efficiently by reading it from right to left. Eq. (24), i.e. direct deconvolution, without the additional weighting term (i.e. vv=1) approximates the true image, but also reveals artifacts stemming from the windowing. By applying the additional weighting term v, these artifacts can be suppressed effectively. The weighting v may be computed by applying Eq. (24) without the additional weighting term to a constant image of the same size as the blurred image g. The deconvolved constant image reveals the same artifacts. By taking its inverse pixel-wise, it serves as a corrective weighting term, which is able to remove most artifacts caused by the windowing and at the same time is fast to compute.

In order to avoid local minima and robustify the blur estimation in the first phase, a coarse-to-fine iteration over several scales may be employed. In the beginning the resolution of the recorded image g may be reduced and the blur estimation phase is performed. Then the lower resolution blur estimate initializes the next scale, and so on, up to the full resolution of the recorded image. At the coarsest scale, the unknown sharp image f may be initialized by a downsampled version of the blurry image g (scaled between zero and one). For a fixed scale the steps (i)-(iii) are visualized in FIG. 6 and will be detailed in the following.

After having estimated and fixed the blur parameters μ, the final sharp image f may be recovered by replacing the $L_2$ image prior of the sharp image update step by a natural image prior that is based on sparsity of the gradient images (e.g. Fergus et al. [4]), i.e. one minimizes the term.

$$\|g-\mu \diamond f\|_2^2 + v\|\partial f\|_1^\alpha \qquad (26)$$

where the $L_1$ term represents a natural image prior for some α<1.

To minimize Eq. (9), Krishnan and Fergus's [10] approach may be adapted for stationary non-blind deconvolution in the non-stationary case: after introducing the auxiliary variable v one alternatingly minimizes $$\min \|g - \mu \diamond f\|_2^2 + 2^t \|f - v\|_2^2 + \frac{1}{2000} \|v\|_1^{2/3} \quad (27)$$

in f and v. The weight $2^t$ increases from 1 to 256 during nine alternating updates in f and v for $t=0, 1, \ldots, 8$. Choosing $\alpha=\frac{2}{3}$ allows an analytical formula for the update in v, see Krishnan and Fergus [10].

GPU Implementation

The algorithm detailed above lends itself to parallelization on a Graphics Processing Unit (GPU). We reimplemented all steps of the algorithm in PyCUDA, a Python wrapper to NVIDIA's CUDA API. To evaluate the speedup, the run time of the single core MATLAB on an Intel Core i5 was compared against a Tesla C2050. Tab. 1 shows that deblurring real images of realistic sizes can be performed about hundred times faster on GPUs than on usual (single core) processors.

IV. In a Further Embodiment of the Invention, it Will be Shown how the Filters May be Applied to the Problem of Reconstructing Astronomical Images.

It is assumed that at each time point $t=1, 2, \ldots$ the telescope records a blurry image $y_t$ that is obtained from a common underlying image x by blurring it with some unknown blur kernel $f_t$ and adding noise $n_t$. The blurred images $\{y_1, y_2, \ldots\}$ arrive in a streaming fashion, and to model reality it is assumed that only a limited buffer of size W (window-size) exists for saving them. A method is online if it has access to only one image at a time, i.e., W=1, while if the image stream is terminated and all the observed (say T) images are available, it is called a batch method (W=7). Naturally, when 1<W<T one has a hybrid procedure.

For notational simplicity, the method shall described in terms of one-dimensional images represented as column vectors. However, the algorithm and results can be easily reformulated in terms of two-dimensional images. Indeed, all experiments by the inventors have actually been performed in the two-dimensional (matrix) setting.

Let each recorded image $y_t$ be a vector of length $l_y$, and the unknown true image x have length 1x. The atmospheric blurring of x is modeled as a non-circular convolution with a non-negative blur kernel (point spread function (PSF)) $f_t$; this convolution is denoted by $f_t * x$, and $f_t$ can be represented as a column vector of length $1_f = 1x - 1y + 1$.

For streaming data coming from a telescope, each observed image $y_t$ will be convolved by a different and unknown PSF $f_t$.

The non-circular convolution can be written equivalently (with appropriate zero-padding) as a matrix-vector multiplication, i.e., $f_t * x = F_t x$, in which the $1y \times 1x$ matrix $F_t$ depends solely on $f_t$. The variables $f_t$ and $F_t$ will be used interchangeably in the following. For an efficient implementation, the special form of $F_t$ allows for a fast computation of the matrix-vector product $F_t x$ via the Fast Fourier Transform (FFT). Individual components of the vector $F_t x$ are denoted by $(F_t x)_j$. Fractions of vectors should be understood as component-wise fractions.

For high-intensity astronomy data, the relationship between yt, ft, and x may be modeled as $$y_t = f_t * x + n_t \quad (28)$$

where the noise $n_t$ is assumed to be Gaussian with mean 0 and diagonal covariance matrix $\sigma^2 I$. Assuming a fixed but unknown a one can deblur by minimizing the loss $$L_t(x, f_t; y_t) = \|y_t - F_t x\|_2^2 \quad (29)$$

that must be minimized subject to non-negativity restrictions on x and $f_t$. For low intensity data, the Poisson model is considered more suitable, $$y_t \sim \text{Poisson}(f_t * x) \quad (30)$$

though the least-squares model seems to more robust. Hence, the invention will focus its attention on (28) and (29) alone. However, the inventive online reconstruction scheme may be extended to handle (30), if desired.

If one had access to all the images $\{y_t\}_{t \geq 1}$, then ideally one would like to minimize the total overall loss $$\min_{x, f_1, f_2, \ldots, f_T} \sum_{t=1}^{T} L_t(x, f_t; y_t) \quad (31)$$

where $L_t(x, f_t; y_t)$ is the loss incurred at the t-th step as given by (29). However, the images $y_t$ in a streaming fashion with a limited buffer of size W, while minimizing the overall loss (31) requires saving all the $y_t$.

The overall loss (31) is non-convex due to the joint dependence between x and ft via the convolution ft ?x. Next, an online algorithm is described that approximately tackles both these difficulties for the purely online case of W=1, noting that it can be easily generalized to deal with the hybrid scenario with W>1.

From each observed image $y_t$ one needs to estimate the PSF $f_t$, as well as the underlying image x. Let xt−1 be the current estimate of the true image. Now, a new observation $y_t$ may be obtained and an estimate of the true image may be updated, while at the same time estimating the PSF $f_t$. To this end, one may minimize the loss incurred at time-step t. Formally stated, the following non-negatively constrained problem may be solved $$\min_{f_t \geq 0, x \geq 0} L_t(x, f_t; y_t) = \|y_t - F_t x\|^2 \quad (32)$$

to obtain the updated estimate $x_t$ and the PSF $f_t$.

Thus, by solving only Problem (32) at each step t we obtain an online procedure that addresses the first concern mentioned above. However, the second issue still remains as even Problem (32) is non-convex, whereby in general a globally optimal solution for it cannot be found efficiently. Fortunately, the objective function is sufficiently well-behaved as it is individually convex in each variable if the other is held fixed. This crucial property lies at the heart of a simple alternating minimization or descent scheme for solving (32). Such a scheme constructs a sequence of iterates $\{x_t^k, f_t^k\}$ ensuring descent, i.e.

$$L_t(x_t^{k+1}, f_t^{k+1}; y_t) \leq L_t(x_t^k, f_t^k; y_t) \quad (33)$$

and under some weak assumptions it can be shown to converge to a stationary point of (32).

However, performing alternating descent too well comes at a price, namely the overfitting of $y_t$. To avoid overfitting, one can perform just a few iterations of alternating descent, and as our experiments will show one or two iterations suffice for good results. The question to answer now is how to perform such iterations so that the descent condition (6) is satisfied. We propose the following two steps:

The following steps are proposed for recovering a true underlying image x, given the input stream of blurred images $\{y_t\}_{t \geq 1}$. Estimates for the individual blur kernels $f_t$ are obtained as a byproduct.

Now, the method performs the following two steps:
1. $f_t = \arg\min_{f \geq 0} \|y_t - Fx_{t-1}\|^2$
2. $x_t = \arg\min_{x > 0} g_t(x, x_{t-1})$ Step 1 is a non-negative least-squares (NNLS) problem and it can be solved efficiently using known methods, preferably the LBFGS-B algorithm of [3].

In step 2, $g_t(x, x_{t-1})$ is an auxiliary function that must fulfill $$\forall x, \tilde{x} : g_t(x, \tilde{x}) \geq g_t(x, x) = L_t(x, f_t, y_t).$$

This condition ensures that the choice of $x_t$ in Step 2 can only decrease our loss function since by definition $$g_t(x_{t-1}; x_{t-1}) \geq g_t(x_t, x_{t-1}) \geq g_t(x_t; x_t)$$

It may readily be seen that for the quadratic loss such a function is given by $$g_t(x, \tilde{x}) = y_t^T y_t - 2 y_t^T F_t x + \tilde{x}^T F_t^T F_t \left(\frac{x \times x}{\tilde{x}}\right)$$

where × denotes element wise product and division of two vectors is understood componentwise. The solution to Step 2 is obtained in closed form by solving $\nabla_x g_t(x_t, x_{t-1}) = 0$ for $x_t$, which yields the following multiplicative update, $$x_t = x_{t-1} \times \frac{F_t^T y_t}{F_t^T F_t x_{t-1}} \quad (34)$$

This update respects the non-negativity constraint on x as all involved quantities are non-negative.

The reason for solving for $f_t$ using NNLS, is that while for x one merely performs descent using the technique of auxiliary functions. The reasoning is as follows:

The unknown image x is common to all the observed images, while the PSFs differ from image to image. Hence, x and $f_t$ need to be treated differently. To that end, given the current estimate of the image $x_{t-1}$ and the new input image $y_t$, the loss $L_t$ may be minimized w.r.t. $f_t$, while for x one merely descends on $L_t$. Doing so essentially ensures that $f_t$ is fit well, and that $x_t$ is not too different from $x_{t-1}$.

After performing Steps 1 and 2 it is clear that the estimates of f and x, have been improved because Step 1 minimizes over f, while in Step 2 the auxiliary function $g_t(x; x_{t-1})$ ensures we make a descent. Thus, the descent guarantee (6) holds, and takes the form $$L_t(x_t, f_t; y_t) \leq L_t(x_{t-1}, d; y_t) \quad (35)$$

for arbitrary $x_{t-1}$ and f.

An method for online blind deconvolution for astronomical imaging according to the above discussion is shown in FIG. 7 in pseudo code.

For the Poisson case, the inventive approach takes the form:
1. $f_t = \arg\min_{f \geq 0} KL(y_t; f * x_{t-1})$
2. $x_t = \arg\min_{x \geq 0} g_t(x, x_{t-1})$ where KL denotes the generalized Kullback-Leibler divergence and $g_t(x, x_{t-1})$ is an appropriate auxiliary function for the associated loss. Step 1 can be again solved using the LBFGS-B method, while the EM derivation of [17] yields $$g_t(x, \tilde{x}) = 1^T F_t x - y_t^T \Lambda \log(x) + c$$

where c is a constant independent of x, and $\Lambda$ is the matrix $[\lambda_{jk}] = [(F_t)_{jk} \tilde{x}_k / (F_t \tilde{x})_j]$. The above described method can be modified appropriately to accommodate these changes.

The basic algorithm described above can recover the underlying, clear image given a sequence of blurry images. Now the basic method is extended to incorporate super-resolution and saturation correction. The inventive method is simple, but highly effective as it exploits the abundance of data without sacrificing efficiency.

Since one is interested in a single image x but have several observations $y^t$, despite blurring, one could potentially infer a super-resolved image—provided a change of resolution is incorporated into the forward model. To this end a resizing matrix may be defined as, $$D_m^n = (I_m \otimes 1_n^T)(I_n \otimes 1_m)/m$$

where $I_m$ is the m×m identity matrix, $1_m$ is an m dimensional column vector of ones, and $\otimes$ denotes the Kronecker product. The matrix $D_m^n$ transforms a vector v of length n into a vector of length m. The sum of v's entries $1_n^T D_m^n v$ is preserved. This is a favorable property for images, as the number of photons observed should not depend on the resolution. Even if m and n are not multiples of each other, $D_m^n$ will interpolate appropriately.

Let n be the length of y. For k times super-resolution x and f may be chosen large enough so that f*x has length kn. Now the image model $p(y_t | f_t, x) \propto \exp(-\frac{1}{2} \|y_t - D_n^{kn}(f_t * x)\|^2)$ may be used, which leads to the modified update steps:

E-step: find $f_t \geq 0$ that minimizes $$\|y_t - D_n^{kn}(f_t * x_-)\|^2 \quad (9)$$

M-step: find $x_t \geq 0$ such that $$\|y_t - D_n^{kn}(f_t * x_t)\|^2 \leq \|y_t - D_n^{kn}(f_t * x_-)\|^2, \quad (10)$$

The positive scaling factor k is not restricted to be integral. Only kn needs to be integral.

Saturated (overexposed) pixels can impact image restoration adversely, particularly so in astronomical imaging where one might want to capture faint stars together with stars that are orders of magnitude brighter. A realistic deconvolution method should be able to deal with pixels that are saturated, i.e., those that hit (or come close to) the maximal possible pixel value.

One reasonable way to deal with saturated pixels is to weight them out. Since each frame $y_t$ can have different pixels that are saturated (different frames are aligned differently), it may checked at each iteration which pixels are saturated. To ignore these pixels a weighting matrix may be defined, $$C = \text{Diag}([y_i < \rho])$$

where $\tau$ denotes the maximum pixel intensity, and the Iverson brackets [·] apply component-wise. Then, the updates may be written ignoring the saturated pixels simply by replacing the Euclidean norm with the weighted norm $\|v\|_C^2 = v^T C v$ This approach is equivalent to removing the saturated pixels from the probabilistic model.

According to the invention, pixels in x that are saturated may be recovered in most of the frames $y_t$. The photons corresponding to such a pixel in x have been spread across a whole set of pixels in each frame $y_t$ because of the PSF $f_t$. Thus, if not all these pixels in $y_t$ are saturated, the true value for the corresponding pixel in x will be recovered.

Another application that the invention considers is the estimation of the brightness of stars (Photometry), for which a linear sensor response is required (for the invention purposes, the used CCD sensor may be assumed linear). The intensity counts can then be translated into stellar magnitudes. Clearly, doing so is not directly possible for stars that saturate the CCD. However, one may use the proposed method for deconvolution with saturation correction to reconstruct the photon counts (image intensities) that we might have recorded were the pixel not saturated. These counts may be converted into stellar magnitudes. For the Trapezium stars encouraging results are obtained—see Table 1.

The second application addresses the common problem of object motion in Magnetic Resonance Imaging (MRI). MRI is a medical imaging modality for visualizing the internal structure and function of the human body and animals used in preclinical studies. Compared to computed tomography (CT), MRI provides much greater contrast between different soft tissues, that makes it especially useful in neurological (brain), musculoskeletal, cardiovascular, and oncological (cancer) imaging.

FIG. 6 shows typical frames of two image sequences of a mouse's thorax in a preclinical study for contrast MRI. The sequences correspond to two axial slices at different height. Both were taken with a 7 Tesla ClinScan of Bruker and consist of 200 frames, each 128×128 pixel in size. As can be seen from these frames, object motion produces large blurs and leads to a significant loss in image quality. Besides global object motion also the heart beat causes local distortions. Both global and local deformations can be described by the invention for space-variant filtering. The inventors applied the space-variant blind deconvolution algorithm with 4×4 PSFs of size 20×20 pixels (choosing a Bartlett-Hanning window of size 64×64 pixels with 50% overlap). For kernel estimation additional Tikhonov regularization may be employed. FIG. 6 shows the estimated images of our method. More interestingly, our method can be used for effective motion correction, as at each time step the estimated object image remains at the same position. Dropping the energy constraint on the kernel, the estimated PSFs give not only information about the object motion, but also about the intensity change, which is of mayor interest in contrast or functional MRI. It may be seen that the inventive method recovers more image details.

The invention claimed is:

1. A computer-implemented method for recovering a digital image from an observed digital image acquired by an image acquisition device, the computer-implemented method comprising:
acquiring the observed image;
dividing the observed digital image into at least a first patch and a second patch, wherein the first patch overlaps with the second patch;
for the first patch,
applying a first windowing function to the first patch to obtain a first windowed patch; and
processing the first windowed patch with a first filter having a first point spread function to obtain a first transformed patch;
for the second patch,
applying a second windowing function to the second patch to obtain a second windowed patch; and
processing the second windowed patch with a second filter having a second point spread function to obtain a second transformed patch;
estimating a recovered digital image from at least the first transformed patch and the second transformed patch of the observed digital image; and
outputting the recovered digital image.

2. The computer-implemented method according to claim 1, wherein the recovered digital image has a higher resolution than the observed digital image.

3. The computer-implemented method according to claim 1, wherein the observed digital image includes a saturated pixel, and wherein the saturated pixel is disregarded in processing the first windowed patch with the first filter.

4. The computer-implemented method according to claim 1, wherein the observed image includes an individual color channel, and wherein at least the first point spread function models the individual color channel.

5. The computer-implemented method according to claim 1, wherein the observed image includes multiple color channels, and wherein at least the first point spread function models the multiple color channels.

6. The computer-implemented method according to claim 1, further comprising removing noise from the observed image, wherein removing noise from the observed image comprises:
applying a bilateral filter to at least a portion of the observed image to preserve an edge of the portion; and
applying a shock filter to the at least a portion of the observed digital image to emphasize the edge of the portion.

7. The computer-implemented method according to claim 1, wherein:
dividing the observed digital image further comprises dividing the observed digital image into at least the first patch, the second patch and a third patch,
the computer-implemented further comprises:
for the third patch,
applying a third windowing function to the third patch to obtain a third windowed patch; and
processing the third windowed patch with a third filter having a third point spread function to obtain a third transformed patch; and
estimating the recovered digital image further comprises estimating the recovered digital image from at least the first transformed patch, the second transformed patch and the third transformed patch of the observed digital image.

8. The computer-implemented method according to claim 1, wherein the observed digital image is an astronomical image.

9. The computer-implemented method according to claim 1, wherein the observed digital image is magnetic resonance image (MRI).

10. The computer-implemented method according to claim 2, wherein the first filter is a space-variant filter.

11. A computing device for recovering a digital image from an observed digital image acquired by an image acquisition device, the computing device comprising:
a memory configured to at least store specific computer-executable instructions; and
a processor in communication with the memory, wherein the processor is configured to execute the specific computer-executable instructions to at least:
divide the observed digital image into a plurality of patches, wherein in at least one patch of the plurality of patches overlaps with another patch of the plurality of patches;
for each patch of the plurality of patches,
apply a windowing function to the patch to obtain a windowed patch; and
process the windowed patch with a filter based at least partly on a point spread function to obtain a transformed patch, wherein the filter with which a first windowed patch of the plurality of patches is processed, is different from the filter with which a second windowed patch of the plurality of patches is processed; and estimate a recovered digital image from the transformed patches of the observed digital image; and output the recovered digital image.

12. A non-transitory computer-readable medium having a computer-executable module configured to execute in one or more processors, the computer-executable module being further configured to at least:

divide an observed digital image acquired by an image acquisition device into-at least a first patch and a second patch, wherein the first patch overlaps with the second patch;

for the first patch,
apply a first windowing function to the first patch to obtain a first windowed patch; and
process the first windowed patch with a first filter having a first point spread function to obtain a first transformed patch;

for the second patch,
apply a second windowing function to the second patch to obtain a second windowed patch; and
process the second windowed patch with a second filter having a second point spread function to obtain a second transformed patch;

estimate a recovered digital image from at least the first transformed patch and the second transformed patch of the observed digital image; and output the recovered digital image.

13. The computer device according to claim 11, wherein for each of the plurality of patches, the processor is configured to further execute the specific computer-executable instructions to at least estimate the point spread function, upon which the filter is at least partly based, from the observed image.

14. The computer device according to claim 11, wherein for each of the plurality of patches, the processor is configured to further execute the specific computer-executable instructions to at least jointly estimate a plurality of point spread functions.

15. The computer device according to claim 14, wherein the filter with which the windowed patch is processed, is based at least partly on the plurality of point spread functions.

16. The computer device according to claim 11, wherein processing the windowed patch with the filter provides for a non-stationary convolution of the windowed patch.

* * * * *